US010469671B2

(12) United States Patent
Kosseifi et al.

(10) Patent No.: US 10,469,671 B2
(45) Date of Patent: Nov. 5, 2019

(54) NETWORK-BASED PER-APPLICATION DATA USAGE LIMITATIONS

(71) Applicant: AT&T Mobility II LLC, Atlanta, GA (US)

(72) Inventors: Mario Kosseifi, Roswell, GA (US); Joseph B. Thomas, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/391,328

(22) Filed: Dec. 27, 2016

(65) Prior Publication Data
US 2018/0183940 A1    Jun. 28, 2018

(51) Int. Cl.
*H04M 11/00* (2006.01)
*H04M 15/00* (2006.01)
*H04M 15/02* (2006.01)
*H04L 12/14* (2006.01)

(52) U.S. Cl.
CPC .......... *H04M 15/885* (2013.01); *H04L 12/14* (2013.01); *H04L 12/1403* (2013.01); *H04M 15/00* (2013.01); *H04M 15/846* (2013.01); *H04M 15/848* (2013.01); *H04M 15/852* (2013.01); *H04M 15/888* (2013.01)

(58) Field of Classification Search
CPC ............. H04M 15/885; H04M 15/846; H04M 15/848; H04M 15/888; H04M 15/00; H04M 17/00; H04M 2215/2026; H04M 2215/32; H04W 4/24
USPC ........................................................ 455/405
See application file for complete search history.

(56) References Cited

U.S. PATENT DOCUMENTS

| 8,190,747 B2 | 5/2012 | Irwin et al. |
| 8,238,911 B2 | 8/2012 | D'Amore et al. |
| 8,285,250 B2 | 10/2012 | Rubin et al. |
| 8,452,797 B1 | 5/2013 | Paleja et al. |
| 8,706,863 B2 | 4/2014 | Fadell |
| 9,203,629 B2 | 12/2015 | Momtahan et al. |
| 9,247,017 B2 | 1/2016 | Agarwal et al. |

(Continued)

FOREIGN PATENT DOCUMENTS

| KR | 20120012906 | 2/2012 |
| WO | WO 2015071758 | 5/2015 |

OTHER PUBLICATIONS

Simms, Jesse, "Ting tip for Android: Control which apps use background mobile data," ting mobile that make sense, ting.com, Jan. 19, 2016. https://ting.com/blog/ting-tip-for-android-control-which-apps-use-background-mobile-data/.

(Continued)

*Primary Examiner* — Khoi H Tran
*Assistant Examiner* — B M M Hannan

(57) ABSTRACT

Servers, computer-readable media, and methods are disclosed for halting forwarding of traffic of an application exceeding a per-application data usage limitation. For example, a processor deployed in a telecommunication network may detect traffic between a third-party device and an endpoint device, associate the traffic with an application of a plurality of applications running on the endpoint device, determine, based upon a volume of the traffic, that a per-application data usage limitation for the application is exceeded, and halt forwarding of the traffic when the per-application data usage limitation for the application is exceeded.

20 Claims, 3 Drawing Sheets

(56) References Cited

U.S. PATENT DOCUMENTS

| | | |
|---|---|---|
| 9,338,309 B2 | 5/2016 | Menezes et al. |
| 9,386,165 B2 | 7/2016 | Raleigh et al. |
| 9,426,039 B2 | 8/2016 | Yoo |
| 9,544,195 B1* | 1/2017 | Garg .................. H04L 47/627 |
| 9,979,836 B2* | 5/2018 | Vadakkanmarveettil .................... G06Q 30/0267 |
| 2004/0260630 A1 | 12/2004 | Benco et al. |
| 2007/0254628 A1 | 11/2007 | Rybak |
| 2008/0125079 A1 | 5/2008 | O'Neil et al. |
| 2009/0168660 A1* | 7/2009 | Bhatia .................. H04L 12/14 370/252 |
| 2011/0151831 A1* | 6/2011 | Pattabiraman .......... H04L 12/14 455/405 |
| 2011/0275344 A1* | 11/2011 | Momtahan ............. H04L 12/14 455/405 |
| 2011/0276442 A1* | 11/2011 | Momtahan ............. G06Q 30/00 705/30 |
| 2012/0324196 A1 | 12/2012 | Maillet et al. |
| 2014/0036697 A1* | 2/2014 | Annan .................. H04L 67/22 370/252 |
| 2014/0068212 A1* | 3/2014 | Lin ...................... H04M 15/58 711/162 |
| 2014/0094182 A1* | 4/2014 | Sato ..................... H04L 63/105 455/450 |
| 2014/0179266 A1 | 6/2014 | Schultz et al. |
| 2014/0180877 A1 | 6/2014 | Dotolo |
| 2014/0241155 A1 | 8/2014 | Cha |
| 2015/0109967 A1 | 4/2015 | Hogan et al. |
| 2015/0181047 A1 | 6/2015 | Zalmanovitch et al. |
| 2015/0324220 A1 | 11/2015 | Bugenhagen |
| 2015/0373107 A1 | 12/2015 | Chan et al. |
| 2016/0142559 A1 | 5/2016 | Pollak |
| 2017/0134592 A1* | 5/2017 | Garg .................. H04M 15/885 |
| 2017/0149642 A1* | 5/2017 | Bastaldo-Tsampalis .................... H04L 43/0894 |

OTHER PUBLICATIONS

Lynch, Tyler Wells, "How to limit your phone's data usage," Reviewed.com™, smartphones.reviewed.com, Jul. 6, 2016. http://smartphones.reviewed.com/features/how-to-lower-your-phones-data-usage.

Hoffman, Chris, "Why You Don't Need Third Party Apps to Manage Background Data Use in Android Jelly Bean," MUO, makeuseof.com, Apr. 10, 2013. http://www.makeuseof.com/tag/why-you-dont-need-third-party-apps-to-manage-background-data-use-in-android-jelly-bean.

Chang, Alexandra, "7 Apps for Mastering Your Mobile Data Usage," Wired, wired.com, May 2, 2012. https://www.wired.com/2012/05/7-apps-for-mastering-your-mobile-data-usage/.

"How to Monitor (and Reduce) Your Data Usage on Android," How-To Geek, howtogeek.com, Oct. 10, 2016. http://www.howtogeek.com/140261/how-to-minimize-your-android-data-usage-and-avoid-overage-charges/.

Billa, "5 Best Data Usage Apps for Android to Keep You from Going Over Your Limit," JOA: Joy of Android, joyofandroid.com, Mar. 1, 2016. http://joyofandroid.com/best-data-usage-apps-for-android-to-keep-you-from-going-over-your-limit/.

\* cited by examiner

NETWORK-BASED PER-APPLICATION DATA USAGE LIMITATIONS

The present disclosure relates generally to endpoint device and telecommunication network security, and more particularly to servers, computer-readable media and methods for halting forwarding of traffic of an application exceeding a per-application data usage limitation.

BACKGROUND

Mobile device applications (apps) may engage in various tasks, and collect and report information from an endpoint device without the knowledge of the user or in a manner that is not apparent to the user. Data usage can occur when the application in the background or even in the foreground, as is found in many "free" apps that engage in constant advertisement delivery, and/or constant tracking and reporting of device usage. Applications may also consume more data than the user initially intended. The true intentions of an application may be buried deep in the legalese of the customer licensing and warranty agreements as the user is downloading the application. Most user simply click "I Agree" without fully understanding the background data that the application will use to track device usage and send tracking information to $3^{rd}$ party data collectors. For the user, the extra "hidden" data usage causes battery drain, memory congestion, bandwidth consumption, and usage of data, e.g., a monthly cellular data allotment that could be allocated to other intended purposes.

SUMMARY

Servers, computer-readable media, and methods are disclosed for halting forwarding of traffic of an application exceeding a per-application data usage limitation. For example, a processor deployed in a telecommunication network may detect traffic between a third-party device and an endpoint device, associate the traffic with an application of a plurality of applications running on the endpoint device, determine, based upon a volume of the traffic, that a per-application data usage limitation for the application is exceeded, and halt forwarding of the traffic when the per-application data usage limitation for the application is exceeded.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
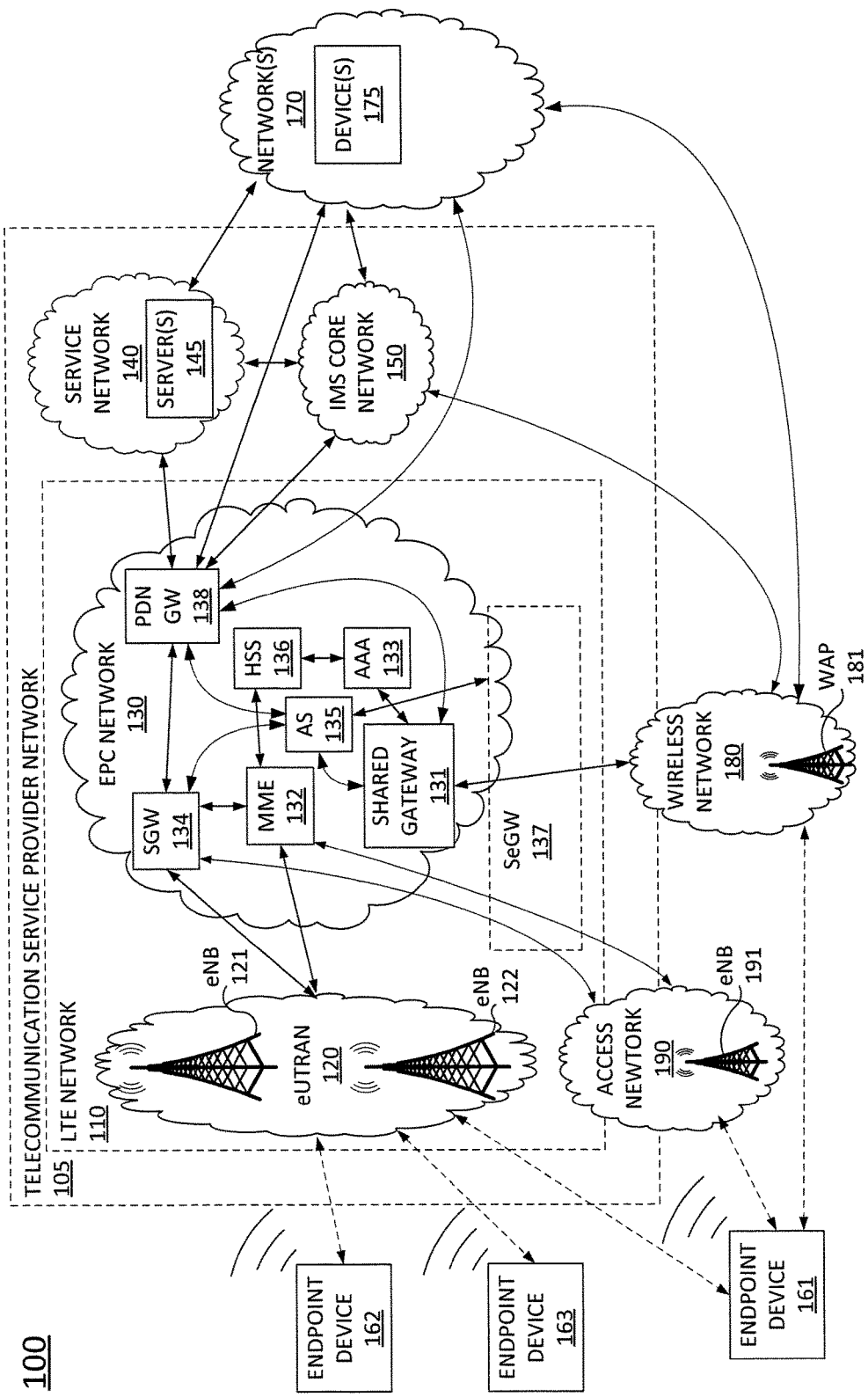
FIG. 1 illustrates an example system related to the present disclosure.

The present disclosure broadly discloses servers, computer-readable media, and methods for halting forwarding of traffic of an application exceeding a per-application data usage limitation. For example, mobile device applications may engage in various tasks, and collect and report information from an endpoint device without the knowledge of the user or in a manner that is not apparent to the user. Data usage can occur when the application operates in the background or foreground. Although the network traffic generated by the application may generally comprise data that is of benefit to the user, such as (vehicular) traffic updates for a map/navigation application, text and media of a social networking application, weather information for a weather application, and so forth, the network traffic may also comprise delivery of advertisements, uploading of data for user/device location tracking and reporting of device usage, which may be unrelated to the actual purpose and function of the application, and so forth. For the user, the extra "hidden" data usage causes battery drain, memory congestion, bandwidth consumption, and usage of data, e.g., a monthly cellular data allotment that could be allocated to other intended purposes. The hidden data usage of applications may also result in a measurable increase in network uplink traffic (and downlink traffic) and may occupy network resources which could otherwise be allocated to legitimate user traffic for the endpoint device, or for endpoint devices of other users in the same region of the network.

Some platforms allow users to limit data usage at a macro level so that a paid-for allocation of data will not be exceeded, and charges for additional data usage will not be incurred. An example is an endpoint device that can shut down all network data usage after a certain predetermined amount of data has been utilized. In one example, network data usage may also be shut down on a per-interface basis, e.g., shutting down cellular data usage, or shutting down Wi-Fi usage after a threshold network data usage for the network interface is exceeded.

Examples of the present disclosure enable users/customers to allocate network data usage limitations to individual applications, or on a "per-application" basis. Thus, for example a user may allocate a greater network data usage limit to a favorite application as compared to a less popular or a less utilized application. For instance, a customer that has a monthly allotment of 10 GB of cellular data usage (e.g., pre-paid or per a contractual rate) could allocate 20% (2 GB) to a social media application, 50% (5 GB) to a video viewing application, 10% (1 GB) to a music application, etc. When an application has used an allotted quantity of data within the relevant time period, e.g., within a month, additional network data consumption, or network traffic of the application may be blocked. As described in greater detail below, the per-application network data usage limitations may be further refined by foreground and background network data usage, by the network interface over which the data usage is occurring, and/or by the direction of traffic, e.g., inbound or outbound, for each application. For example, the data usage of the application via a cellular network may exceed per-application network data usage limitation that is cellular network specific. Thus, data usage via the cellular network may be blocked until additional allowable data usage is purchased and allocated to the application, additional allowable data usage is allocated with the start of a new month or other billing period, the endpoint device is connected to a Wi-Fi service, and so forth. This allows other applications to continue working as intended until their respective allotments of network data usage are depleted.

In one example, a user interface may assist the user to set the per-application network data usage limitations. In addition, a dashboard may report the actual network data usage of various applications, which may also be broken down by foreground and background network data usage, by the-network interface of which the data usage occurs, and/or by the direction (inbound or outbound) of the traffic/data usage, for each application. Therefore, the user may better monitor data usage and be able to identify when and how hidden data is being used.

As stated above, per-application data usage limitations may be refined to include separate limitations for foreground and background network data usage. For example, a user may be willing to tolerate endpoint device location tracking, data reporting, and advertisement downloading while the application is actually in use, i.e., a foreground application, in exchange for the ability to use the application. However, the user may prefer that the application does not constantly track the location of the endpoint device 24 hours a day, seven days a week. Therefore, the user may set a first network data usage limitation for foreground network data usage of the application, and may set a second network data usage limitation for background network data usage of the application. For instance, foreground network data usage may be assumed to generally comprise traffic that is necessary or is innate for an application to provide a primary function, while background network data usage may be more likely to comprise traffic that is not necessary for the application to provide its primary function. For example, foreground data for a weather application may comprise current and forecast weather data for one or more locations, current and/or past satellite image data, and so forth. The foreground data may also include information relating to advertisements that are displayed in real-time, such as advertisements for homeowner's insurance, home maintenance services, car tires, wiper blades, and so forth. However, percentage wise, this type of information may be merely incidental to the traffic relating to the primary function.

On the other hand, it may be assumed that background data usage is more likely to include such things as continual monitoring of current location information of the endpoint device, shopping or web browsing information of the endpoint device, and other information not related to a primary function of the application. In particular, there may be no reason for gathering shopping or web browsing information off of the endpoint device that is related to providing weather information. However, the user knowingly or unknowingly may have granted the weather application access to the user's shopping or web browsing information at the time the weather application was installed. Even if the user was aware of the possibility that the weather application may harvest the shopping or web browsing information off of the endpoint device, the user may still have no concept of how much data usage the application may actually incur. As an example, the application may have inefficient code which continuously accesses and transmits shopping or web browsing information from the endpoint device, just in case the shopping or web browsing information on the endpoint device may have changed. In addition, the reporting of shopping or web browsing information may continue even when the application is in the background. The result may be disproportionate and/or excessive network data usage which the user had no reasonable opportunity to foresee at the time the application was first installed. Thus, in accordance with the present disclosure, network data usage may be limited per-application and may be further divided into per-application foreground network data usage limitations and per-application background data usage limitations.

As stated above, per-application network data usage limitations may alternatively or additionally be segregated by inbound and outbound traffic. To illustrate, for primary functions of a weather application, it may be expected to utilize a much greater proportion of inbound traffic (to the endpoint device) as compared to outbound traffic. For instance, outbound traffic may comprise basic text-based data, such as a city and state, zip code, coordinate location information, time information, etc., while the inbound traffic may comprise satellite image data, animations, video of weather news casts, and so forth. However, due to telemetry, device tracking, and stealth data gathering, the application may attempt to extract much greater quantities of data from the endpoint device. In this regard, in one example, a user may set an outbound network data usage limitation for the weather application. For instance, the outbound network data usage limitation may be set to a level that the user believes is sufficient to accommodate all of the legitimate outbound traffic for the weather application in the relevant time period, but which may be less that the actual volume of outbound traffic that the application may attempt to send during the time period as a result of various other background and/or non-primary function related activities.

In one example, per-application data usage limitations may be enforced at the endpoint device. For example, a third-party application may be installed to manage the user's data usage across all applications. In another example, a network service provider may pre-load a per-application data usage program on endpoint devices sold by the network service provider, or which are approved as being compatible with the network service provider network. In still another example, a maker or platform developer of an endpoint device may implement an application or operating system feature allowing the customer to manage data usage on a per-application basis.

However, in accordance with the present disclosure, enforcement of per-application data usage limitations may be provided within a telecommunication network. For example, a network-based device, such as a gateway device, in the telecommunication network may be configured to apply users' per-application data usage limitations. In one example, the gateway device may detect that a volume of traffic (either inbound or outbound with respect to the endpoint device) will exceed a per-application network data usage limitation. The gateway device may then halt forwarding of the traffic to the destination. In one example, the gateway device may drop the traffic. In another example, the gateway device may divert the traffic for temporary storage, e.g., for a short period of time such as 30 seconds, whereupon the endpoint device may be requested to provide authorization to incur additional data usage, or to confirm that the traffic should be dropped. If authorization is received from the endpoint device, the temporarily stored traffic may be forwarded onward to the destination (e.g., either the endpoint device, for inbound traffic, or a server or other devices, for outbound traffic). Otherwise, if a confirmation to drop the traffic is received, or if no response is received from the endpoint device within the time allotted, the temporarily stored traffic may be dropped.

The network-based device may determine that traffic is associated with a particular application of the endpoint device in several ways. For example, the user may provide authorization for the endpoint device to share information with the network-based device regarding which application is using which port (e.g., which Transmission Control Protocol (TCP) port or which Uniform Datagram Protocol (UDP) port), or identifying an application associated with a TCP session. In one example, the endpoint device may append identification codes within packet/datagram headers, where the identification codes are associated with different applications. For example, with just six bits, up to 64 different applications may be assigned unique identifiers. With seven bits, up to 128 different applications may be assigned unique identifiers, and so forth. Alternatively, or in addition, the network-based device may perform traffic analysis to determine an application that is associated with a packet or flow. For instance, one or more packets may be analyzed to determine that a packet or flow matches a signature, or pattern associated with traffic of the application. As referred to herein, a "flow" or "traffic flow" may comprise a sequence of packets or other protocol data units (PDUs) associated with an application and which are in transit through a network. In addition, the term "traffic" may comprise at least a portion of a flow. Thus, the term "traffic" may also refer to one or more packets and/or other PDUs in transit through the network.

In one example, the signature may be determined in accordance with a supervised or unsupervised learning algorithm. In one example, the signature may be based upon packet/datagram header information and does not consider payload data carried within the packet or the flow of packets.

In one example, the endpoint device may provide a security certificate or token to the network-based device to enable the network-based device to access the contents, e.g., payload data, of a packet or flow. For instance, the traffic may generally be encrypted between the network-based device and the endpoint device via the telecommunication network (and any other intervening networks). However, upon providing a security certificate or token, the user may permit the network-based device to decrypt the packet or flow while in transit. Accordingly, in such an example, the network-based device may determine the application associated with a packet or flow based upon the contents of the packet or flow. In one example, the network-based device may combine a plurality of the foregoing techniques to determine an application associated with a packet or flow, or may utilize a second technique to verify or increase the confidence of a determination of an application associated with a packet or flow that was made using a different technique.

In one example, in addition to dropping the traffic, the network-based device may also cause a TCP connection to be broken. For instance, if an application on the endpoint device is communicating with an advertising server using a unique TCP port, e.g., port 91, the network-based device may cause the endpoint device and/or the advertising server to determine that port 91 is unusable when an acknowledgement (ACK) message is not received from the recipient device. In another example, the network-based device may cause inbound traffic to be cached in a network-based data store until a different network interface is available, e.g., a Wi-Fi connection, for the endpoint device. In still another example, the network-based device may alternatively or additionally send an instruction to the endpoint device to cease transmission of traffic in excess of the per-application network data utilization limit. In one example, the endpoint device may cause traffic for the application to be routed to a different network interface. For example, the endpoint device may have both cellular and Wi-Fi connections available. However, at a given time and location the endpoint device a packet scheduling algorithm may generally favor the cellular interface due to a poor Wi-Fi connection. However, if it is detected that the application has exceeded a per-application cellular network data usage limitation and an instruction is sent to the endpoint device notifying of the exceeding of the limitation, the endpoint device may then cause any traffic for the application, or background data for the application to be sent via the Wi-Fi interface. In addition, incoming traffic for the application may be routed from the network-based device to the endpoint device via the Wi-Fi interface.

Examples of the present disclosure may improve user experience as users have more control over their own data usage. Customers generally do not want, and are often fearful, of background data searches and transmissions that are not necessary for the core functions of an application. Examples of the present disclosure may also decrease unnecessary battery usage, memory allocation, and network bandwidth utilization. In this regard, examples of the present disclosure are not restricted to limiting applications' cellular data usage, but may be applied to per-application data usage limitations for a variety of network interfaces, including Wi-Fi interfaces or other non-cellular wireless interfaces, wired interfaces, and so forth. Operations of a telecommunication network may also be improved insofar as some non-customer directed data usage or "hidden" data usage may be eliminated, thereby freeing-up network resources for customers' intended uses. In addition, power usage, spectrum utilization, carrier allocation, and the like may also be improved. Moreover, application developers may be incentivized to better control the network data usage of their applications as it becomes known that the user can limit applications' network data usage. These and other aspects of the present disclosure are discussed in greater detail below in connection with the examples of FIGS. 1-3.

To better understand the present disclosure, FIG. 1 illustrates an example network, or system 100 that may implement embodiments of the present disclosure for halting forwarding of traffic of an application exceeding a per-application data usage limitation. In one example, the system 100 includes a telecommunication service provider network 105. The telecommunication service provider network 105 may comprise a Long Term Evolution (LTE) network 110, a service network 140, and a core network, e.g., an IP Multimedia Subsystem (IMS) core network 150. The system 100 may further include other networks 170 connected to the telecommunication service provider network 105. As shown in FIG. 1, the system 100 may connect endpoint devices 161-163 with server(s) 145 in service network 140, with devices 175 in networks 170, and/or with other components of telecommunication service provider network 105. The endpoint devices 161-163 may each comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device"). In one example, the endpoint devices 161-163 may each comprise a device of a subscriber or customer of the telecommunication service provider network 105. For instance, endpoint devices 161-163 may comprise devices of a single customer account, and be used by the same user or by different users, e.g., different members of a family sharing the customer account.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3$^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint devices 161-163, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks and the like.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint devices 161-163. HSS 136 may also maintain and provide information about subscribers' locations. In one example, Authentication, Authorization, and/or Accounting (AAA) server 133 obtains subscriber profile information from HSS 136 to authenticate and authorize endpoint devices to connect to EPC network 130 via Institute for Electrical and Electronics Engineers (IEEE) 802.11 (Wi-Fi)/non-3GPP access networks. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, system 100 may also include an application server (AS) 135. In one example, application server 135 may comprise a device, such as computing system 300 depicted in FIG. 3, specifically configured to provide one or more functions for halting forwarding of traffic of an application exceeding a per-application data usage limitation, in accordance with the present disclosure. As used herein, the terms "instantiate," "configure," and "reconfigure" may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth. Example functions of AS 135 are described in greater detail below.

In one example, service network 140 may comprise one or more devices, such as server(s) 145 for providing services to subscribers, customers, and or users. For example, telecommunication service provider network 105 may provide a cloud storage service, web server hosting, and other services. As such, service network 140 may represent aspects of telecommunication service provider network 105 where infrastructure for supporting such services may be deployed. It should be understood that service network 140 may include any number of components to support one or more services that may be provided to one or more subscribers, customers, or users by the telecommunication service provider network 105.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, a peer network (e.g., a cellular network and/or LTE network of a different telecommunication service provider), and the like. In one example, the networks 170 may include different types of networks. In another example, the networks 170 may be the same type of network. In one example, the networks 170 may represent the Internet in general. Devices 175 may include servers, such as web servers, storage devices, enterprise servers, email servers, and so forth. Devices 175 may also include personal computers, desktop computers, laptop computers, personal digital assistants (PDAs), tablet computing devices, endpoint devices of a same or a similar nature as endpoint devices 161-163, or any other devices for wireless and/or wired communications. In one example, endpoint devices 161-163 may communicate with devices 175 in networks 170 via PDN GW 138 and/or via PDN GW 138 and IMS core network 150, e.g., for voice over LTE (VoLTE)-based calls or Wi-Fi calling.

In one example, system 100 may also include an access network 190 with an eNodeB (eNB) 191. The eNodeB 191 may comprise, for example, a home eNodeB (HeNB), a "small cell", such as a femtocell, a microcell, etc., and/or a "low power" eNodeB. For instance, eNB 191 may have a range of 2 kilometers or less, while eNodeBs 121 and 122 may have a range of up to 35 kilometers or more. In one example, access network 190 and eNB 191 may connect to EPC network 130 via a subscriber/customer broadband connection. For instance, access network 190 may comprise a home network of a customer/subscriber and eNodeB 191 may connect via a home gateway (not shown) or similar equipment deployed at the customer premises to SGW 134 and MME 132 in EPC network 130, e.g., via S1 interfaces. While access network 190 may comprise a home network, eNodeB 191 may continue to be managed by a telecommunication service provider network 105 or may be managed by a customer/subscriber associated with access network 190. In another example, access network 190 and eNodeB 191 may be controlled and/or managed by telecommunication service provider network 105. In other words, access network 190 and eNodeB 191 may be part of telecommunication service provider network 105 and/or LTE network 110. For instance, an operator of telecommunication service provider network 105 may add access network 190 and eNodeB 115 as a small cell, picocell, femtocell, or the like to fill gaps in coverage of macro-cells or to temporarily support larger numbers of endpoint devices in an area, e.g., at a concert, sporting event, or other large gathering. In still another example, access network 190 may comprise a portion of a peer network, e.g., of a different telecommunication service provider.

In one example, access network 190 and eNodeB 191 may further connect to SGW 134 and MME 132 via a security gateway (SeGW) 137. SeGW 137 may provide an anchor point for secure communications between eNodeB 191 and EPC network 130. In particular, since access network 190 may comprise a customer premises, it may be more vulnerable to attack and compromise, and may provide a vector for entry into telecommunication service provider network 105 and EPC network 130. Thus, in one example, SeGW 137 may establish an IP security (IPsec) tunnel between itself and the eNodeB 191. The SeGW 137 may comprise a firewall or perform similar functions to analyze and filter traffic from eNodeB 191 before passing the traffic to SGW 134 or MME 132, or alternatively dropping the traffic or passing the traffic to a quarantine device or other network based device, e.g., for further analysis, malicious traffic signature generation, temporary network-based storage, and so forth.

In one example, EPC network 130 may also include a shared gateway 131. In one example, shared gateway 131 may comprise an evolved packet data gateway (ePDG), a trusted wireless local area network (WLAN) authentication, authorization, and accounting (AAA) proxy (TWAP), and a trusted WLAN access gateway (TWAG). In other words, shared gateway 131 may comprise a device that is configured to provide functions of all of an ePGD, a TWAP and a TWAG. In one example, ePDG functionality of the shared gateway 131 may process traffic from endpoint devices accessing the EPC network 130 via untrusted wireless networks (e.g., IEEE 802.11/Wi-Fi networks), while TWAP/TWAG functionality of shared gateway 131 may process traffic from endpoint devices accessing the EPC network via trusted wireless networks (e.g., IEEE 802.11/Wi-Fi networks). For example, wireless access point (WAP) 181, in wireless network 180 may represent an untrusted WAP. Thus, wireless network 180 may comprise an untrusted wireless network. In one example, WAP 181, e.g., a wireless router that may communicate with endpoint device 161 via an IEEE 802.11/Wi-Fi based link, connects to shared gateway 131 via an S2b interface. In addition, in one example, endpoint device 161 may be connected to shared gateway 131 via a secure tunnel, e.g., an IPsec tunnel, wherein traffic carried via the secure tunnel is passed via the WAP 181, but is indecipherable to the WAP 181. For example, the payload data may be encrypted using an encryption key, or keys, which may be held by endpoint device 161 and shared gateway 131, but which WAP 181 does not possess. In one example, the secure tunnel between the endpoint device 161 and shared gateway 131 may comprise a SWu interface.

In another example, WAP 181 may represent a trusted WAP. Thus, wireless network 180 may comprise a trusted wireless access network. In such an example, WAP 181 may connect to shared gateway 131 via an S2a interface. For instance, the link between WAP 181 and shared gateway 131 may also comprise an IPsec tunnel. However, it should be noted that the IPsec tunnel terminates at WAP 181 and not at the endpoint device 161, in contrast to the example where WAP 181 is untrusted, where a secure tunnel is established between the shared gateway 131 and endpoint device 161.

Wireless networks and WAPs may be designated as "trusted" or "untrusted" based upon several factors, such as whether the wireless network is a customer or subscriber network, or a peer network, e.g., of a different telecommunication service provider, based upon a model or type of WAP, and so forth. In one example, wireless network 180 and WAP 181 may be untrusted insofar as wireless network 180 may comprise a home network of a subscriber of telecommunication service provider network 105. For instance, communication equipment at a residential customer premises may, in general, be more susceptible to tampering and other types of information security breaches as compared to communication infrastructure that is under the control of an operator of telecommunication service provider network 105. In addition, in one example, a trust designation of a WAP or wireless access network may be changed, e.g., from "trusted" to "untrusted", based upon various events, such as an invalidity of a security certificate of a WAP, a detection of a port opening at the WAP, and so forth.

In one example, wireless network 180 may further be connected to shared gateway 131 via SeGW 137. For instance, in one example, SeGW 137 may serve as an anchor point for secure communications between EPC network 130 and external devices. Thus, in another example, a secure tunnel (e.g., an IPsec tunnel) may be established between WAP 181 and SeGW 137, e.g., instead of a secure tunnel being established between trusted WAP 181 and shared gateway 131. Similarly, a secure tunnel may be established between endpoint device 161 and SeGW 137, e.g., instead of a secure tunnel between endpoint device 161 and shared gateway 131. It should be noted that SeGW 137 may comprise a component of EPC network 130, or may comprise a component of LTE network 110 that is considered to be external to the EPC network 130. It should also be noted that in one example, SeGW 137 or shared gateway 131 may perform the above described functions based upon instructions executed locally on such devices. However, in another example, SeGW 137 and/or shared gateway 131 may perform such functions under the instructions of AS 135.

In one example, AS 135 may be configured and deployed in the system 100 as shown to perform various operations for halting forwarding of traffic of an application exceeding a per-application data usage limitation, in accordance with the present disclosure. In one example, AS 135 may store per-application data usage limitations for various endpoint devices of subscribers of telecommunication service provider network 105, such as endpoint devices 161-163. For instance, the per-application data usage limitations may be received from any one or more subscriber devices. In one example, the per-application data usage limitations may be per-application data usage limitations on a subscriber account-basis, e.g., to be enforced across a plurality of endpoint devices of the subscriber account. In one example, the per-application data usage limitations may specify the network data usage limits for various applications over a given time period, e.g., daily, over a one week period, over a two week period, over a one month period, and so forth. In one example, per-application data usage limitations may further comprise per-network interface data usage limitations (per-application), per-traffic direction network data usage limitations (per-application), and/or per-application status data usage limitations (per-application). For instance, AS 135 may receive several per-application data usage limitations associated with a customer account comprising endpoint devices 161-163. In one example, a first per-application data usage limitation may comprise a limitation of 50 MB of data per week for outbound cellular traffic for an application, while a second per-application data usage limitation may comprise a limitation of 200 MB of data per week for inbound cellular traffic for the application. It should be noted that the first and second per-application data usage limitations may apply across endpoint devices 161-163. For instance, different copies of a weather application may be operating on endpoint devices 161-163, which may be used by different members of a family. The different family members may utilize different quantities of data via the weather application depending upon their respective usage patterns. However, the first and second per-application data usage limitations may be enforced in the telecommunication service provider network 105 via AS 135 collectively with respect to the copies of the same weather application running on the different endpoint devices 161-163.

In another example, a first per-application data usage limitation may comprise a limitation of 25 MB of background traffic (both inbound and outbound) per week for an application, while a second per-application data usage limitation may comprise 200 MB of foreground traffic (both inbound and outbound) per week for the application). In still another example, a first per-application data usage limitation for an application may comprise a limitation of 25 MB of outbound cellular traffic per week when the application status is "background," while a second per-application data usage limitation may comprise 50 MB of outbound cellular traffic per week when the application status is "foreground," a third per-application data usage limitation may comprise 200 MB of inbound cellular traffic per week when the application status is foreground, a fourth per-application data usage limitation may comprise 50 MB of inbound cellular traffic per week when the application status is background, a fifth per-application data usage limitation may comprise 50 MB of inbound Wi-Fi traffic per week when the application status is background, and there may be no limitation provided for inbound Wi-Fi traffic when the application status is "foreground." The foregoing are just several illustrative examples of possible combinations of per-application network data usage limitations that may be provided to AS 135 for a subscriber account. Thus, it should be appreciated that various other combinations of per-application network data usage limitations may be utilized. However, in all cases, the network data usage limitations are applicable to an individual application, whether on a single endpoint device or across a plurality of endpoint devices of a subscriber account.

In one example, AS 135 may keep track of network data usage for various application on various endpoint devices and/or for various subscriber accounts. In this regard, AS 135 may receive traffic/network data usage statistics from one or more gateway devices such as SGW 134, shared gateway 131, SeGW 137, PDN GW 138, and so forth. The AS 135 may determine to which application the traffic belongs in various ways. For instance, as described above, the application may be determined through port identification, through application labels inserted in packet/datagram headers, through deep packet inspection, through traffic analysis and application pattern/signature matching, and so forth.

In one example, the AS 135 may provide instructions to other network elements to halt forwarding of traffic of an application exceeding a per-application data usage limitation. For instance, AS 135 may detect that traffic for a weather application running on endpoint device 162 has exceeded a per-application network data usage limitation for outbound cellular data usage. The weather application of endpoint device 162 may be sending traffic to and receiving traffic from multiple devices 175 in networks 170. In the present example, the traffic may pass between endpoint device 162 and the devices 175 through EPC network 130 via eNodeB 121, SGW 134, PDN GW 138, and other intermediate devices (not shown). Accordingly, in one example, AS 135 may send an instruction to SGW 134 to drop outbound traffic from endpoint device 162 that is associated with the weather application.

In one example, SGW 134 may track and categorize packets or other quantities of traffic as belonging to particular flows, e.g., traffic between IP address/port pairs. For instance SGW 134 may label flows with a hash value or the like, and may maintain and update various statistics regarding each flow, such as a volume of outbound or inbound data usage, an average bandwidth utilization for the flow over an incoming or outgoing network link, inter-packet arrival times for the flow, and so forth. In one example, SGW 134 may report aggregate statistics for different flows to AS 135, e.g., periodically or on on-demand basis. For instance, SGW 134 may send aggregate reports every 30 seconds, every minute, every five minutes, etc. In one example, AS 135 may further store and compile data from aggregate reports, e.g., over a time period of a day, a week, a month, etc. In one example, AS 135 may determine which flows are associated with which applications based upon data from the aggregate reports.

Alternatively, or in addition, in one example SGW 134 may forward traffic (e.g., outbound traffic) for endpoint device 162, as well as for other endpoint devices connecting to EPC network 130 via eUTRAN 120, to AS 135 for inspection and analysis on an ongoing basis. AS 135 may identify that traffic belongs to a particular flow, determine an application associated with the traffic (and hence also associated with the flow), determine that the traffic causes a per-application data usage limitation to be exceed, and send an instruction to the SGW 134 to drop the traffic associated with the flow. In one example, the instruction may identify the particular flow. Thus, SGW 134 may filter traffic associated with a particular flow based upon instructions from AS 135. In one example, the filtering may comprise dropping the traffic. In another example, the filtering may comprise temporarily storing the traffic at SGW 134. For instance, AS 135 may send a notice to endpoint device 162 that the per-application data utilization limit has been exceeded along with a request to confirm that the traffic should be dropped or to provide an authorization to exceed the limitation. Thus, SGW 134 may temporarily store the traffic while awaiting a response, e.g., for 30 seconds, for one minute, or for some other time period. Depending upon the response (or lack thereof) the traffic may then be released to be forwarded to the destination (e.g., device 162 or one of devices 175) or may be dropped. In still another example, the filtering may comprise diverting the traffic to a storage device in the EPC network 130 (not shown), e.g., depending upon a user preference or based-upon a configuration of the SGW 134 by an operator of telecommunication service provider network 105.

The foregoing describes an example of applying a per-application data usage limitation to outbound traffic via a cellular interface. However, per-application data usage limitations may also be applied for an application's data usage over multiple network interfaces, or on a per-interface basis for a different interface. In this regard, AS 135 may receive traffic and/or flow statistics from other gateway devices, such as shared gateway 131 and/or SeGW 137, and may send instructions to such devices to drop, store, and/or forward traffic of a flow depending upon whether a per-application data usage limitation is exceeded and whether an endpoint device or counterpart device of the flow is attempting to send traffic across the network interface in excess of the limitation. Thus, for example, if AS 135 determines that an inbound per-application data usage limitation for inbound Wi-Fi traffic associated with a weather application on endpoint device 161 is exceeded, AS 135 may identify a flow label associated with the Wi-Fi traffic for the weather application via shared gateway 131 and may send an instruction to shared gateway 131 or SeGW 137 identifying the flow and directing the shared gateway 131 or SeGW 137 to drop or to temporarily store the traffic of the flow. AS 135 may further send an instruction to shared gateway 131 or SeGW 137 to drop or release temporarily stored traffic of the flow, e.g., after receiving a confirmation from endpoint device 161 to drop the traffic, after receiving an authorization to exceed the limitation and release the traffic, or after a designated time has passed without receiving a response form endpoint device 161.

In another example, AS 135 may detect that a per-application data usage limitation for a weather application has been exceeded with respect to traffic from endpoint device 163 via eUTRAN 120. However, the limitation may apply to all of endpoint devices 161-163 of the same use account. Thus, to enforce the limitation, AS 135 may send instructions to SGW 134 as well as to shared gateway 131 and/or SeGW 137 to drop or to temporarily store any traffic to or from endpoint devices 161-163 that is associated with the weather application.

In another example, AS 135 may enforce inbound per-application data usage limitations via PDN GW 138. For instance, PDN GW 138 may track and gather statistics of various flows between endpoint devices 161-163 (and other subscriber devices of telecommunication service provider network 105) and other devices such as server(s) 145, device(s) 175 in networks 170, and so forth. In this way, traffic in excess of a limitation may be dropped or temporarily stored at the inbound edge of EPC network 130 in the same or in a similar manner as described above with respect to SGW 134, shared gateway 131 and/or SeGW 137. This may alleviate and reduce the traffic load at various other intermediate elements in EPC network 130 before the traffic reaches an egress gateway at an opposite edge of EPC network 130, such as SGW 134 or shared gateway 131. Numerous other variations of the enforcement of per-application data usage limitations may be provided in connection with the system 100. Accordingly, it should be noted that the foregoing examples are provided by way of illustration only.

It should also be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN), and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, SeGW 137, shared gateway 131, and/or SGW 134 may be combined into a single component or into two components. Alternatively, or in addition, AS 135 may be integrated with any one or more of such components. In another example, AS 135 may be combined with AAA 133 and/or HSS 136.

In still another example, shared gateway 131 may be separated into respective components of an ePDG, a TWAP, and a TWAG. In addition, various elements of eUTRAN 120, EPC network 130, and IMS core network 150 may be omitted for clarity, including gateways or border elements providing connectivity between such networks. Similarly, due to the relatively large number of connections available between devices in the system 100, various links between AS 135, shared gateway 131, SeGW 137, MME 132, SGW 134, AAA server 133, HSS 136, eNodeBs 121 and 122, PDN GW 138, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, and the like, or a future technology or standard-based network). Similarly, although the shared gateway 131, AS 135, HSS 136, AAA server 133, and SeGW 137 are illustrated as components within EPC network 130 having a particular configuration, in other examples, any one or more of these components may be deployed in a different configuration. For example, HSS 136 and/or AAA server 133 may be deployed in IMS core network 150, SeGW 137 may reside external to EPC network 130 within LTE network 110, and so on. Thus, these and other modifications are all contemplated within the scope of the present disclosure.

Figure 2:
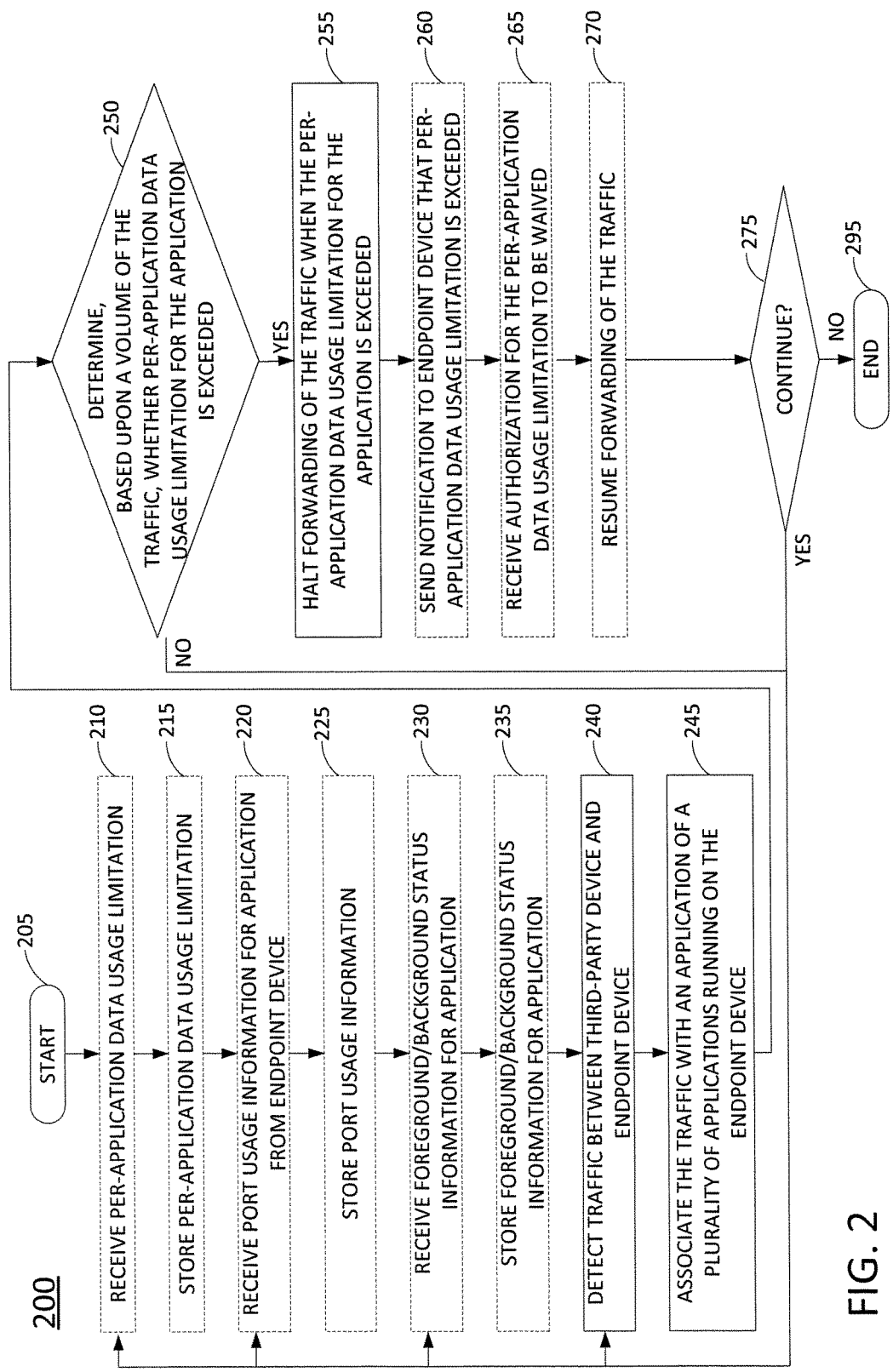
FIG. 2 illustrates a flowchart of an example method for halting forwarding of traffic of an application exceeding a per-application data usage limitation.

FIG. 2 illustrates a flowchart of an example method 200 for halting forwarding of traffic of an application exceeding a per-application data usage limitation, in accordance with the present disclosure. In one example, steps, functions and/or operations of the method 200 may be performed by a network-based device, e.g., a server, such as AS 135 in FIG. 1, a gateway device such as shared gateway 131, SeGW 137, PDN GW 138, or SGW 134, or AS 135 in conjunction with other components of the system 100 such as shared gateway 131, SeGW 137, PDN GW 138, and/or SGW 134, and so on. In one example, the steps, functions, or operations of method 200 may be performed by a computing device or system 300, and/or a processor 302 as described in connection with FIG. 3 below. For example, the system 300 may represent an application server or a gateway device, in accordance with the present disclosure. For illustrative purposes, the method 200 is described in greater detail below in connection with an example performed by a processor, such as processor 302. The method begins in step 205 and may proceed to optional step 210, optional step 220, optional step 230, or step 240.

At optional step 210, the processor may receive a per-application data usage limitation for an application. In one example, the per-application data usage limitation for the application may apply to: one or both of inbound and outbound traffic, one or both of foreground and background traffic, and/or one or both of cellular and Wi-Fi traffic. Thus, in one example, the per-application data usage limitation for the application may comprise a limitation associated with a data usage of the application over a cellular network. Notably, per-application data usage limitations that are applicable to cellular data usage may be used to prevent monthly data allotments that are charged at a contractually agreed rate from being exceeded and to prevent customer accounts from being charged higher rates for data usage in excess of the contractual limits. However, per-application data usage limitations that are applicable to non-cellular data usage, such as Wi-Fi data usage, data usage via a wired interface, e.g., via an Ethernet local area network (LAN), and so forth may be used to prevent excessive, undesirable and/or "hidden" data usage from draining endpoint device batteries too quickly, from causing network congestion, from causing additional power consumption for network-based devices to process the traffic, and/or for tying up network resources that could otherwise be allocated to legitimate user traffic for other application on the endpoint device or for the traffic of other endpoint devices, and so forth.

In one example, the per-application data usage limitation for the application comprises a limitation associated with a data usage of the application across a plurality of endpoint devices associated with a customer account. In one example, the per-application data usage limitation for the application comprises a daily limitation, a weekly limitation, or a monthly limitation. In one example, the per-application data usage limitation is a percentage of an absolute limitation of the data usage of the application within a given time period. For example, the per-application data usage limitation may comprise a threshold of 50% usage of a daily limitation within a 12 hour window. In another example, the per-application data usage limitation may comprise a daily limitation that is set at a data volume of $1/7^{th}$ of a weekly per-application data usage limitation.

In one example, the processor may further receive additional per-application data usage limitations for the application and/or for other applications. For instance, the per-application data usage limitation for the application may comprise a limitation on outbound background data usage, while an additional per-application data usage limitation for the application may comprise an inbound, foreground cellular data usage limitation. Additional per-application data usage limitations for one or more different applications running on the endpoint device and/or associated with a plurality of endpoint devices of a customer account may similarly apply to: inbound or outbound traffic, foreground or background traffic, and/or cellular or Wi-Fi traffic.

At optional step 215, the processor may store the per-application data usage limitation. In one example, the per-application data usage limitation may be stored locally within a same device as the processor, or may be stored in an attached or remote data storage device that is accessible to the processor over one or more network links. In one example, the processor may further store additional per-application data usage limitations for the same application and/or for other applications. Following optional step 215, the method 200 may proceed to optional step 220, optional step 230, optional step 235, or step 240.

At optional step 220, the processor may receive port usage information for the application from the endpoint device. For instance, in one example, the processor is tasked with identifying which application is associated with a given traffic flow. In one example, the endpoint device may provide the processor with port usage information for the application (and for a plurality of applications operating on the endpoint device) to assist the processor in identifying the relevant application associated with a traffic flow. In one example, the port usage information may comprise inbound and/or outbound port information. The port usage information may comprise TCP or UDP port information, for example. As mentioned above, in one example, the per-application data usage limitation for the application comprises a limitation associated with a data usage of the application across a plurality of endpoint devices associated with a customer account. Accordingly, in one example, the plurality of endpoint devices may include the endpoint device for which port usage information for the application is received at optional step 220.

At optional step 225, the processor may store the port usage information for the application. For example, the processor may use port usage information for various applications to help identify which application is associated with a traffic flow. In one example, the application port usage information may be used in conjunction with other information that may be gathered and/or determined by the processor. For instance, the processor may classify traffic flows as belonging to particular applications using application traffic pattern/signature matching, wherein at least a portion of the pattern/signature is based upon the port usage. In one example, the patterns may be generated using supervised or unsupervised learning algorithms based upon training and test traffic flows. Following optional step 225, the method 200 may proceed to optional step 230, optional step 235, or step 240.

At optional step 230, the processor may receive foreground/background status information of the application. For instance, in one example, the per-application data usage limitation may apply to either foreground data usage or background data usage of the application. Thus, in one example, the endpoint device may provide a notification to the processor of whether the application is currently a foreground application or a background application. In one example, background traffic of an application comprises traffic that is transiting the telecommunication network when the application is a background application on the endpoint device. Conversely, foreground traffic of an application comprises traffic that is transiting the telecommunication network when the application is a background application on the endpoint device.

At optional step 235, the processor may store the per-application foreground/background status information. In one example, the processor may determine whether the per-application data usage limitation is currently enforceable with respect to traffic of the application (for the particular endpoint device) based upon the per-application foreground/background status information, e.g., at step 250, described in further detail below.

At step 240, the processor detects traffic between a third-party device and an endpoint device through a telecommunication network in which the processor is deployed. In one example, the telecommunication network may comprise a cellular network, such as an EPC network. In one example, the third-party device is a device of a third-party that is an entity different from a subscriber/customer/user associated with the endpoint device and that is different from an operator of the telecommunication network in which the processor is deployed. In one example, the processor may be in the path of the traffic through the network, and may receive and forward the traffic. In another example, the processor may be deployed in a device that is not within the path of the traffic, but which may receive notification of the traffic from one or more other devices. For instance, a gateway device or other network-based devices may track and store statistics and other information regarding traffic flows through the device, and may report aggregate statistics for different traffic flows to the processor periodically or on on-demand basis. For instance, the network-based device may send aggregate reports every 30 seconds, every minute, every five minutes, etc. In one example, the processor may store and compile data from aggregate reports, e.g., over a time period of a day, a week, a month, etc. In addition, the processor may store and compile data from multiple aggregate reports from different network-based devices. In one example, the traffic may be detected when a data volume of the flow (e.g., one of the aggregate statistics of the flow) increases from a previous value.

At step 245, the processor associates the traffic with an application of a plurality of applications running on the endpoint device (e.g., the same application that is the subject of optional steps 210-235). In one example, the processor may determine that the traffic is associated with the application based upon data regarding the flow (or the traffic which belongs to the flow) from the aggregate reports. For instance, the traffic may be identified as being associated with the application based upon the traffic (or flow) matching a signature, or pattern for the traffic (or flow) of the application. In one example, the signature may be determined in accordance with a supervised or unsupervised learning algorithm. In one example, the signature may be based upon packet/datagram header information and does not consider payload data carried within a packet, the traffic, or the flow of packets. In one example, the processor may associate the traffic with the application by identifying a source port or a destination port included in the traffic (e.g., within packet headers of packets of the traffic). For instance, at optional steps 220 and 225, the processor may receive and store port usage information for the application and/or for the plurality of applications running on the endpoint device. Accordingly, the processor may determine that the traffic is associated with the application based at least in part upon a match between the port usage information that is stored for the application and the source and/or destination port information contained in the (packet(s) of) the traffic. For instance, the port usage information may comprise at least a portion of a signature or pattern for the application. Additional factors that may be included in the signature or pattern many include a packet burst size, a packet inter-arrival time, and so forth. Correlations with other traffic flows may also be considered as part of a signature or pattern of the application. For instance, the application may always send telemetry data to several tracking servers of different advertising networks. Thus, a recurring pattern may be a packet burst to destination A, flowed by a packet burst to destination B, and so forth. However, in one example, the source port or destination port information alone may be sufficient to classify the traffic as being associated with the application.

In one example, the endpoint device may provide a security certificate or token to enable the processor access the contents, e.g., payload data, of a packet, the traffic, and/or the flow. For instance, the traffic may generally be encrypted between the third-party device and the endpoint device via the network service provider network (and any other intervening networks). However, upon providing a security certificate or token, the user may permit the processor to decrypt the packets of the traffic and/or the flow while in transit. Accordingly, in such an example, the processor may determine that the application is associated with the traffic based upon the packet contents (e.g., application/payload/user data). In another example, the endpoint device may include application identifiers in packets being sent or received in connection with particular applications (e.g., in packet headers). Thus, in one example, the processor may determine that the traffic is associated with the application by cross-referencing the application identifier contained in one or more packets with a stored list of application identifiers and the associated applications. In one example, the processor may combine a plurality of the foregoing techniques to determine that the application is associated with the traffic, or may utilize a second technique to verify or increase the confidence of a determination of the application associated with the traffic that was made using a different technique.

In one example, the traffic comprises background traffic of the application, e.g., where the per-application data usage limitation for the application comprises a limitation associated with a background data usage of the application. In one example, the processor may determine that the traffic comprises background traffic of the application after first determining that the traffic is associated with the application, e.g., in the manner described above. In one example, the processor may determine that the traffic is background traffic (as opposed to foreground traffic) based upon the foreground/background status information of the application that may be received and stored at optional steps 230 and 235. In one example, the background traffic may comprise at least one of advertising information or usage information of the endpoint device. The usage information may comprise, for example: location data, contact data, other applications installed and/or in use on the endpoint device, phone calls and/or text messages sent or received, the recipients or senders of such calls or messages, and so forth.

At step 250, the processor determines, based upon a volume of the traffic, that a per-application data usage limitation for the application is exceeded. In one example, the processor maintains a running total of data usage associated with the application within in a given time period. The data usage may be particular to inbound or outbound traffic, or may be aggregated over both inbound and outbound traffic for the application. In one example, a running total of the data usage may be particular to the endpoint device or may be aggregated for the application with respect to a plurality of endpoint devices associated with a customer account. In this regard, in one example, the running total of the data usage associated with the application may be based upon information received from various devices within the telecommunication network. For instance, the data usage may be based upon data usage statistics for a first endpoint device of a customer account that is received from a SGW and data usage statistics for a second endpoint device of a customer account that is received from a shared gateway. In any event, the processor may add the volume of the traffic to the previously determined data usage for the application over the relevant time period. The total may be compared to the per-application data usage limitation which may be stored, e.g., at optional step 215, and which may be accessible by the processor at step 250. In this way, the processor may determine that the previous data usage plus the current volume of the traffic exceeds the per-application data usage limitation.

At step 255, the processor halts a forwarding of the traffic (e.g., to the endpoint device or to the third-party device) when the per-application data usage limitation for the application is exceeded. In one example, the halting the forwarding of the traffic may comprise dropping the traffic. In one example, the halting the forwarding of the traffic may comprise sending an instruction to a gateway device of the telecommunication network to drop the traffic. In another example, the halting the forwarding of the traffic may comprise temporarily storing the traffic at a device of the processor, diverting the traffic to a network-based storage device for temporary storage, and/or sending an instruction to a gateway device or other network-based device to store or divert the traffic for storage. For instance, at optional step 260 the processor may send a notice to the endpoint device that the per-application data utilization limit has been exceeded, along with a request to confirm that the traffic should be dropped or to provide an authorization to exceed the limitation. Thus, the processor may temporarily store the traffic while awaiting a response, e.g., for 30 seconds, for one minute, or for some other time period. Following step 255, the method 200 may proceed to step 295 or to optional step 260.

At optional step 260, the processor may send a notification to the endpoint device that the per-application data usage limitation for the application is exceeded. In one example, the notification may cause an audible alert to be played via the endpoint device, and/or may cause a visible alert to be presented via a display screen of the endpoint device. In one example, the notification may also include a request to confirm that the traffic should be dropped or to provide an authorization to exceed the limitation.

At optional step 265, the processor may receive, from the endpoint device, an authorization for the per-application data usage limitation for the application to be waived. For instance, the request may cause a dialog box to be presented on the endpoint device with a button to confirm that the traffic should be dropped, and a button to authorize the per-application data usage limitation to be waived. The user may select a button by pressing an area of the display/touch screen corresponding to one of the two buttons. The endpoint device may transmit the response to the device of the processor upon the selection by the user. Thus, in one example, the processor may receive the authorization at optional step 265 when the user selects the button for waiving the per-application data usage limitation, i.e., authorizing the per-application data usage limitation to be exceeded. In another example, the endpoint device may present a further option for the user to select a duration of time for which the per-application data usage limitation is permitted to be exceeded, or a data volume by which the per-application data usage limitation is permitted to be exceeded. Thus, the processor may again halt the forwarding of traffic associated with the application if and when the extra time limit or additional data volume limit is exceeded.

At optional step 270, the processor may resume a forwarding of the traffic (e.g., to the endpoint device or to the third-party device) when the authorization is received. For example, the processor may release the traffic that is temporarily stored at a device of the processor or that is stored at another network-based data storage device. In the latter case, the processor may send an instruction to the network-based data storage device to cause the network-based data storage device to release and forward the traffic towards the destination. Following optional step 270, the method proceeds to step 295. At step 295, the method 200 ends.

It should be noted that the method 200 may be expanded to include additional steps. For instance, as mentioned above, at optional step 260 the processor may send a notification to the endpoint device that the per-application data usage limitation for the application is exceeded, with a request to confirm that the traffic should be dropped or to provide an authorization to exceed the limitation. In one example, a response may be received from the endpoint device that the traffic should be dropped. Thus, in one example, the method 200 may be expanded to include dropping the traffic (e.g., from a temporary storage location) when such a confirmation is received. Similarly, the processor may fail to receive a response within a response timeout period, following which, the processor may also drop the traffic (e.g., from the temporary storage location).

In another example, the processor may detect additional traffic associated with the application that is from another endpoint device of a same customer account (e.g., where the per-application data usage limitation applies to a plurality of endpoint devices of the customer account). Thus, in such an example, if it is determined at step 250 that the per-application data usage limitation is exceeded, the method 200 may be expanded to include halting the forwarding of additional traffic for other endpoint devices of the customer account that is associated with the same application. In another example, the method 200 may be expanded to include sending the notification that the per-application data usage limitation is exceeded to another endpoint device of a customer account. For instance, a child may be using an application on a first endpoint device and may cause the per-application data usage limitation for the application to be exceeded. However, an authorization for the per-application data usage limitation to be waived (i.e., to release the traffic in excess of the limitation) may be received from a second endpoint device that is used by a primary user of the customer account (e.g., a parent who is paying for the account).

In still another example, when the traffic comprises inbound traffic to the endpoint device and when the per-application data usage limitation is applicable to a particular network interface (e.g., a limitation that is specific to cellular data usage), the method 200 may be expanded to include sending the traffic in excess of the per-application data usage limitation to the endpoint device via a different network interface. For instance, the traffic may be sent to the endpoint device via a path that includes a Wi-Fi connection to the endpoint device, as opposed to via a cellular access network, such as an eUTRAN. To illustrate, the endpoint device may be in communication with the telecommunication network via multiple interfaces, which may include at least one non-cellular access network. In addition, at a given time, the endpoint device may have a strong cellular signal, while a non-cellular connection, such as a Wi-Fi connection, may be available but with a more limited bandwidth and/or throughput. In such case, the network may generally send traffic to the endpoint device via the cellular network. However, if a per-application data usage limitation for the application relates to cellular traffic, and if the limitation is exceeded, the processor may instead preferentially send the traffic via an alternative network interface. The traffic may reach the endpoint device with a lower throughput that the cellular link, but the endpoint device is nevertheless reachable. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may be omitted, or can be combined, separated, and/or performed in a different order from that described above, without departing from the example embodiments of the present disclosure.

Figure 3:
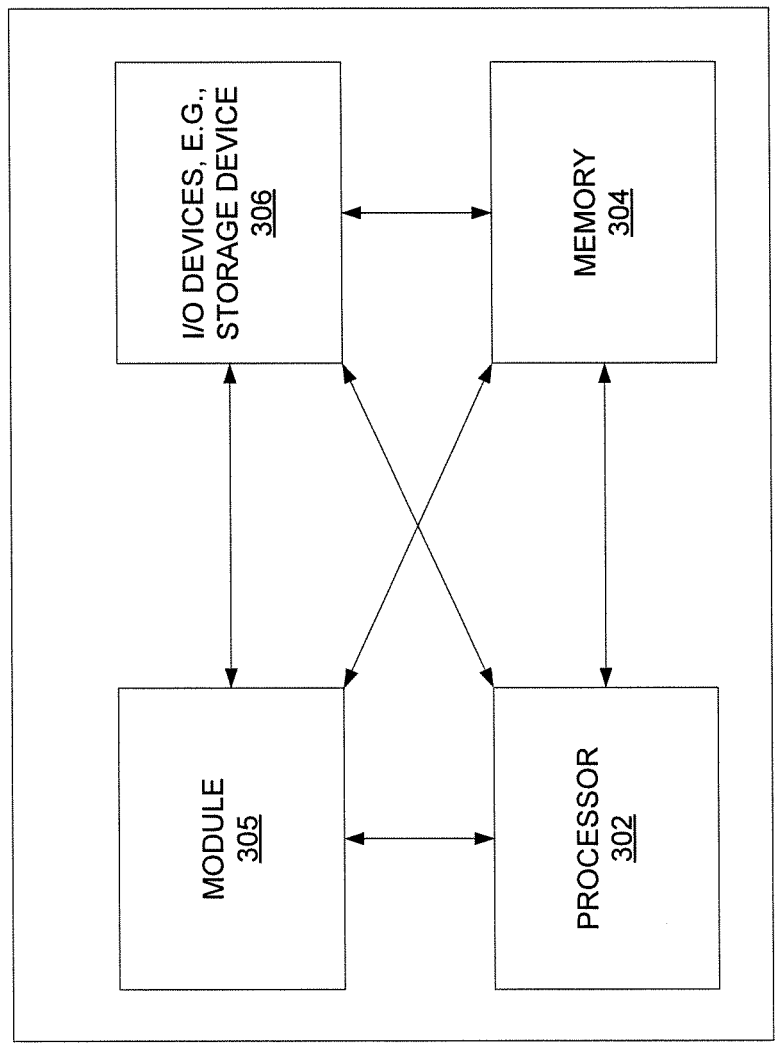
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for halting forwarding of traffic of an application exceeding a per-application data usage limitation, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for halting forwarding of traffic of an application exceeding a per-application data usage limitation (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for halting forwarding of traffic of an application exceeding a per-application data usage limitation (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A server deployed in a telecommunication network, the server comprising:
   a processor; and
   a computer-readable medium storing instructions which, when executed by the processor, cause the processor to perform operations, the operations comprising:
      receiving a per-application data usage limitation from an endpoint device;
      storing the per-application data usage limitation;
      detecting traffic between a third-party device and the endpoint device;
      associating the traffic with an application of a plurality of applications running on the endpoint device;
      determining, based upon a volume of the traffic, that the per-application data usage limitation for the application is exceeded;
      halting a forwarding of the traffic when the per-application data usage limitation for the application is exceeded, wherein the halting the forwarding of the traffic comprises:
         stopping the forwarding of the traffic at a gateway of the telecommunication network; and
         diverting the traffic for storage in at least one of: a memory or a data store;
      sending a notification to the endpoint device that the per-application data usage limitation for the application is exceeded;
      receiving, from the endpoint device, an authorization to waive the per-application data usage limitation for the application; and
      resuming the forwarding of the traffic from the memory or the data store when the authorization is received.

2. The server of claim 1, wherein the traffic comprises background traffic of the application, wherein the per-application data usage limitation for the application comprises a limitation associated with a background data usage of the application.

3. The server of claim 2, wherein the background traffic comprises at least one of:
   advertising information; or
   usage information of the endpoint device.

4. The server of claim 2, wherein the background traffic comprises traffic that is transiting the telecommunication network when the application is a background application on the endpoint device.

5. The server of claim 4, wherein the endpoint device notifies the processor when the application is the background application.

6. The server of claim 1, wherein the traffic is associated with the application by identifying a source port or a destination port included in the traffic.

7. The server of claim 6, wherein the endpoint device provides port usage information to the server for the plurality of applications.

8. The server of claim 1, wherein the operations further comprise:
receiving port usage information for the application from the endpoint device; and
storing the port usage information for the application, wherein the associating the traffic with the application is based on the port usage information that is stored.

9. The server of claim 1, wherein the operations further comprise:
receiving at least one of: foreground status information or background status information of the application; and
storing the at least one of: the foreground status information or background status information of the application.

10. The server of claim 9, wherein the per-application data usage limitation for the application comprises a limitation associated with a data usage of the application over the cellular network.

11. The server of claim 1, wherein the per-application data usage limitation for the application comprises a limitation associated with a data usage of the application across a plurality of endpoint devices associated with a customer account, wherein the plurality of endpoint devices includes the endpoint device.

12. The server of claim 1, wherein the telecommunication network comprises a cellular network.

13. The server of claim 1, wherein the endpoint device is in communication with the telecommunication network via a non-cellular access network.

14. The server of claim 1, wherein the halting the forwarding of the traffic further comprises sending an instruction to the gateway device of the telecommunication network to drop the traffic.

15. The server of claim 14, wherein the gateway device comprises:
a packet data network gateway;
a serving gateway; or
a security gateway.

16. The server of claim 14, wherein the gateway device comprises, an evolved packet data gateway, a trusted wireless local area network authentication, authorization, and accounting proxy, and a trusted wireless local area network access gateway.

17. A non-transitory computer-readable medium storing instructions which, when executed by a processor of a server deployed in a telecommunication network, cause the processor to perform operations, the operations comprising:
receiving a per-application data usage limitation from an endpoint device;
storing the per-application data usage limitation;
detecting traffic between a third-party device and the endpoint device;
associating the traffic with an application of a plurality of applications running on the endpoint device;
determining, based upon a volume of the traffic, that the per-application data usage limitation for the application is exceeded;
halting a forwarding of the traffic when the per-application data usage limitation for the application is exceeded, wherein the halting the forwarding of the traffic comprises:
stopping the forwarding of the traffic at a gateway of the telecommunication network; and
diverting the traffic for storage in at least one of: a memory or a data store;
sending a notification to the endpoint device that the per-application data usage limitation for the application is exceeded;
receiving, from the endpoint device, an authorization to waive the per-application data usage limitation for the application; and
resuming the forwarding of the traffic from the memory or the data store when the authorization is received.

18. A method comprising:
receiving, by a processor of a server deployed in a telecommunication network, a per-application data usage limitation from an endpoint device;
storing, by the processor, the per-application data usage limitation;
detecting, by the processor, a traffic between a third-party device and the endpoint device;
associating, by the processor, the traffic with an application of a plurality of applications running on the endpoint device;
determining, by the processor, based upon a volume of the traffic, that the per-application data usage limitation for the application is exceeded;
halting, by the processor, a forwarding of the traffic when the per-application data usage limitation for the application is exceeded, wherein the halting the forwarding of the traffic comprises:
stopping the forwarding of the traffic at a gateway of the telecommunication network; and
diverting the traffic for storage in at least one of: a memory or a data store;
sending, by the processor, a notification to the endpoint device that the per-application data usage limitation for the application is exceeded;
receiving, by the processor, from the endpoint device, an authorization to waive the per-application data usage limitation for the application; and
resuming, by the processor, the forwarding of the traffic from the memory or the data store when the authorization is received.

19. The method of claim 18, wherein the traffic comprises background traffic of the application, wherein the per-application data usage limitation for the application comprises a limitation associated with a background data usage of the application.

20. The method of claim 19, wherein the background traffic comprises at least one of:
advertising information; or
usage information of the endpoint device.

* * * * *